US007375273B2

(12) United States Patent
Sawyer-Kovelman et al.

(10) Patent No.: US 7,375,273 B2
(45) Date of Patent: May 20, 2008

(54) ELECTRONIC MUSIC STAND AND METHOD OF USING THE SAME

(75) Inventors: Noreen E. Sawyer-Kovelman, 5344 Seneca Pl., Simi Valley, CA (US) 93063; Breeana C. Kovelman, Simi Valley, CA (US)

(73) Assignee: Noreen E. Sawyer-Kovelman, Simi Valley, CA (US)

(*) Notice: Subject to any disclaimer, the term of this patent is extended or adjusted under 35 U.S.C. 154(b) by 0 days.

(21) Appl. No.: 11/550,821

(22) Filed: Oct. 19, 2006

(65) Prior Publication Data

US 2008/0092723 A1 Apr. 24, 2008

(51) Int. Cl.
*A63H 5/00* (2006.01)
*G04B 13/00* (2006.01)
*G10H 7/00* (2006.01)
*G09B 15/00* (2006.01)
*G09B 15/02* (2006.01)

(52) U.S. Cl. ...................................... 84/609; 84/477 R

(58) Field of Classification Search .................. 84/609, 84/470 R, 471 R, 477 R, 478, 483.1
See application file for complete search history.

(56) References Cited

U.S. PATENT DOCUMENTS 5,400,687 A * 3/1995 Ishii ......................... 84/477 R
5,533,903 A * 7/1996 Kennedy ................ 434/307 R
5,760,323 A * 6/1998 Romero et al. ........... 84/470 R
6,483,019 B1 * 11/2002 Hamilton .................. 84/477 R
7,064,261 B2 * 6/2006 Shao ......................... 84/477 R
2001/0037719 A1 * 11/2001 Gardner et al. ............... 84/478
2003/0110926 A1 * 6/2003 Sitrick et al. ............. 84/477 R
2005/0241462 A1 * 11/2005 Hirano ........................ 84/600

* cited by examiner

*Primary Examiner*—Jeffrey Donels
(74) *Attorney, Agent, or Firm*—Paul H. Kovelman

(57) ABSTRACT

An electronic music stand is for displaying at least one sheet of music for a musician. The electronic music stand includes a housing, at least one power source to provide power to the electronic music stand, a display, at least one memory element, at least one processor, and at least one interface. The display is sized to display the at least one sheet of music so that it is viewable during a performance by the musician of the at least one sheet of music. The at least one memory element is for storing the at least one sheet of music, and the at least one processor is operatively coupled with the display and the at least one memory element to display the at least one sheet of music on the display. The at least one interface allows the musician to interact with the electronic music stand to change the at least one sheet of music to a different one of the at least one sheet of music during a performance of the at least one sheet of music so that the different one of the at least one sheet of music is displayed on the display. In further variations, the at least one interface provides the musician with ability to change to the different one of the at least one sheet of music during the performance so that the musician is free of physical contact with display of the electronic music stand. In particular variations, the at least one interface includes at least one motion sensor and/or pedal actuator to provide the musician with the ability to change to the different one of the at least one sheet of music during the performance so that the musician is free of physical contact with display of the electronic music stand.

31 Claims, 5 Drawing Sheets

ELECTRONIC MUSIC STAND AND METHOD OF USING THE SAME

FIELD OF THE INVENTION

This invention relates to music stands and displays and, in particular embodiments, to an electronic music stand and method of use of the stand.

BACKGROUND OF THE INVENTION

Traditionally, music stands are free standing small podiums that hold several sheets of music, and can display one or more of these sheets at a time. Although inexpensive and convenient, the music may blow away or fall off of the stand as people pass or sheets are turned. To overcome the sheets falling off, music stands will occasionally use bars, wires or clothespins to hold the sheets down. However, this may make it difficult to turn sheets or change music. Also, if a music piece is more than a sheet or two long, a musician must turn the pages, this can be both time consuming and difficult during play of the piece, particularly, if it is a complicated piece of music. Also, it is not uncommon for the music sheets to fall off the stand or the stand to tip over, which can be distracting or dangerous to musician and or instruments.

There have been some personal computers that could display music. However, they are bulky and generally do not show a whole sheet of music in a way that facilitates the user to play the piece. Computers are good for inputting a MIDI signal and converting the signal to music or scanning in a sheet of music for later review. However, the computers are not designed to match the needs of a musician playing a non-computer instrument. Some music, such as from musicnotes.com is in the form of digital music that shows a sheet of music and includes a MIDI track to play the music. However, this proprietary software is only for display and printing on a personal computer.

SUMMARY OF THE DISCLOSURE

It is an object of an embodiment of the present invention to provide an improved music stand, which obviates for practical purposes, the above mentioned limitations.

According to an embodiment of the invention, an electronic music stand is for displaying at least one sheet of music for a musician. The electronic music stand includes a housing, at least one power source to provide power to the electronic music stand, a display, at least one memory element, at least one processor, and at least one interface. The display is sized to display the at least one sheet of music so that it is viewable during a performance by the musician of the at least one sheet of music. The at least one memory element is for storing the at least one sheet of music, and the at least one processor is operatively coupled with the display and the at least one memory element to display the at least one sheet of music on the display. The at least one interface allows the musician to interact with the electronic music stand to change the at least one sheet of music to a different one of the at least one sheet of music during a performance of the at least one sheet of music so that the different one of the at least one sheet of music is displayed on the display. In further embodiments, the at least one interface provides the musician with ability to change to the different one of the at least one sheet of music during the performance so that the musician is free of physical contact with display of the electronic music stand. In particular embodiments, the at least one interface includes at least one motion sensor and/or pedal actuator to provide the musician with the ability to change to the different one of the at least one sheet of music during the performance so that the musician is free of physical contact with display of the electronic music stand.

In other embodiments, the electronic music stand further includes at least one speaker to produce tones useable for tuning a musical instrument. In alternative embodiments, the electronic music stand further includes at least one speaker to produce musical notes from the at least one sheet of music. In still other embodiments of the present invention, the electronic musical stand includes at least one microphone to pick up the notes from a musical instrument. In further embodiments, the processor of the electronic music stand uses the notes picked up by the at least one microphone to follow the performance of the music on the at least one sheet of music.

In some embodiments of the present invention, the display is sized to display more than one sheet of the at least one sheet of music displayed on the display. In particular embodiments, the display is sized to display at least two or three sheets of the at least one sheet of music displayed on the display. In alternative embodiments, the display is sized to display an entire sheet of the at least one sheet of music displayed on the display. In other embodiments of the present invention, the display is a touch screen that allows interface using a stylus. In further embodiments of the present invention, the at least one memory element is sized to hold at least 100, 1,000 or 10,000 sheets of music.

In particular embodiments of the present invention, the at least one interface allows the musician to change to another different sheet of music until all of the at least one sheets of music have been displayed on the display.

In other embodiments of the present invention, the electronic music stand can keep pace along with the musician as the musician progresses through the notes in the music shown on the at least one sheet of music displayed on the display, and the display shows an enlarged portion around the currently played notes of the at least one sheet of music for easier viewing. In alternative embodiments, the display shows an enlarged one or more lines of music around the currently played notes of the at least one sheet of music for easier viewing. In still other embodiments, the display automatically changes the displayed at least one sheet of music to the different at least one sheet of music when the musician reaches an end note of the at least one sheet of music displayed on the display.

In further embodiments of the present invention, the electronic music stand further includes a base to support the electronic music stand above a floor. In other embodiments, the electronic music stand further includes a light shade to cover the display and shade the at least one sheet of music displayed on the display. In yet another embodiment of the present invention, the display further includes a back light to illuminate the at least one sheet of music displayed on the display.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, where like numerals designate corresponding parts in the several figures.

DETAILED DESCRIPTION OF THE PREFERRED EMBODIMENTS

Figure 1:
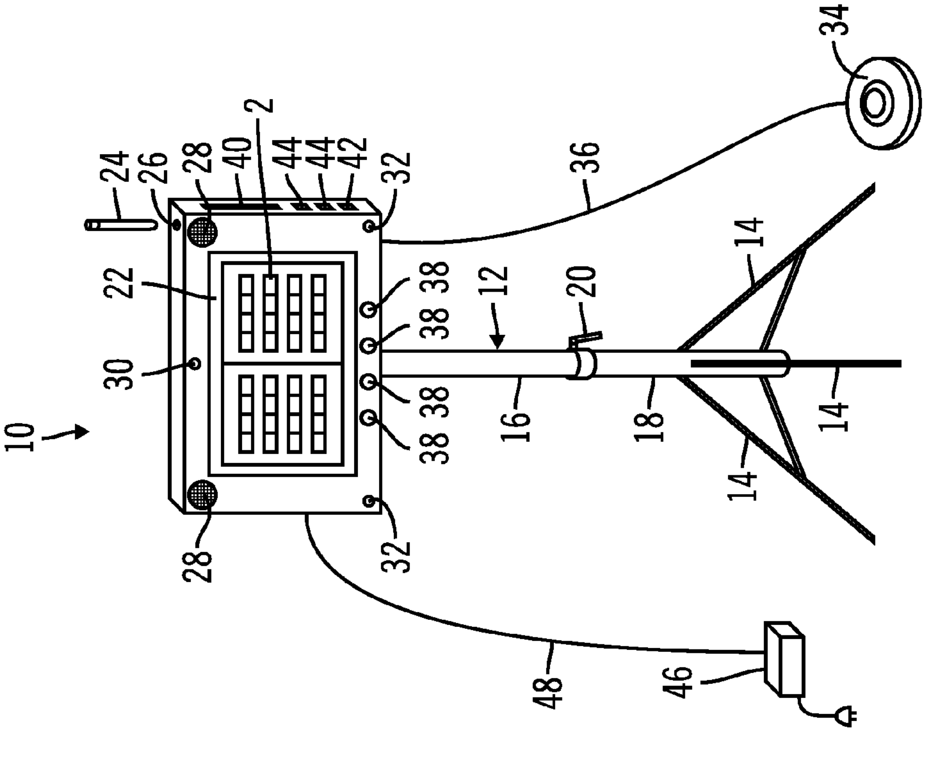
FIG. 1 is a perspective view of an electronic music stand mounted on a self supporting base in accordance with an embodiment of the present invention.

As shown in the drawings for purposes of illustration, the invention is embodied in an electronic music stand. In preferred embodiments of the present invention, the electronic music stand is a free standing device for use with a musical instrument. However, it will be recognized that further embodiments of the invention may be used to display pages on stands for speaking, singing, karaoke, or in other environments where full pages and turning of pages is needed.

An electronic music stand in accordance with an embodiment of the present invention displays at least a full sheet (or page) of music so that it appears as if a sheet of paper is being shown on a traditional music stand. Since the image is digitally created, it cannot blow away or fall off of the display of the electronic music stand. In addition, the digital image permits the displayed music to be manipulated in various ways that would not be possible with traditional paper sheet music, thus affording the musician options to enhance their performance.

An electronic music stand allows the user to carry a large number of musical pieces in a single slim display. Conversely, in the past, musicians had to carry a large number of books, or even large loose leaf binders with copies of music, all of which could fall or become disorganized. The electronic music stand in accordance with an embodiment of the present invention also facilitates turning of the pages, with a minimum of effort and distraction. Alternative embodiments may utilize speakers, microphones and various buttons to facilitate manipulation of the electronically displayed sheet of music.

In particular embodiments, music may be listed in categories (or genres) such as, but not limited to, wedding, popular, classic, blues, rock, jazz, Celtic or the like. In other embodiments, the music may be listed in alphabetical order, composer/artist order, or the like. In alternative embodiments, the user may customize the order by, for example, but not limited to, date, country, source/book, speed/tempo, albums, shows, top 5, top 10 (or more), favorites, recently played, recorded songs, instrument, complexity, or the like. In further alternatives, the use may store music, data or settings in a "favorites" type structure for later recall.

FIG. 1 shows an electronic music stand 10 in accordance with an embodiment of the present invention. The electronic music stand 10 is supported by a self-supporting base 12 having a plurality of legs 14. In particular embodiments, the base 12 is removable from the electronic music stand 10. In that case, the legs 14 may fold pack against the base 12 for easy storage. In other embodiments, the base 12 may be formed from telescoping members 16 and 18 that permit the base to be shortened by release of a locking mechanism 20. In still other embodiments, the positions of the legs 14 may be adjusted to accommodate users that use their feet to play their instruments, such as harpists that uses pedal changes. In alternative embodiments, the legs 14 may be omitted and another type of base may be used, such as but not limited to a circular, non-folding base, a platform, a permanent floor mount, or the like. In particular embodiments, the base 12 is removable, while in other embodiments, the base 12 may be permanently attached to the electronic music stand 10. Non-folding bases may be advantageous in some applications because they can be heavier, which would tend to limit tipping over of the electronic music stand 10.

Particular embodiments of the electronic music stand 10 have a weight (without the stand) that is under 15 pounds to permit easy transport of the electronic music stand 10. Other embodiments have a weight under 10 pounds. Still other embodiments have a weight under 7 pounds. Yet other embodiments have a weight under 5 pounds. Yet sill other embodiments have a weight under 3 pounds, and yet still further embodiments have a weight under 1 pound, with the weight being determined by the playing environment, the features and complexity of the hardware used in the electronic music stand 10, the amount of interfaces, and the power supply of the electronic music stand 10.

Figure 4B:
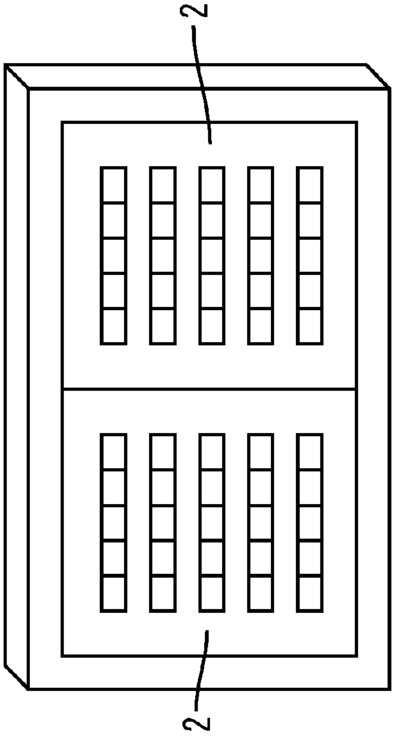
FIGS. 4(*a*)-(*c*) are perspective views of different sized electronic music stands in accordance with embodiments of the present invention.
Figure 4A:
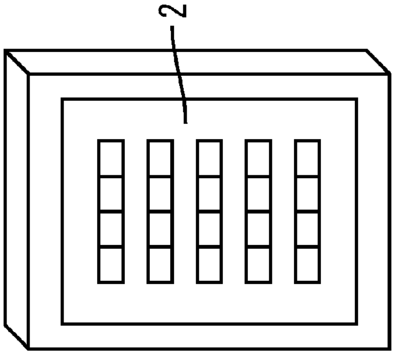
Figure 4C:
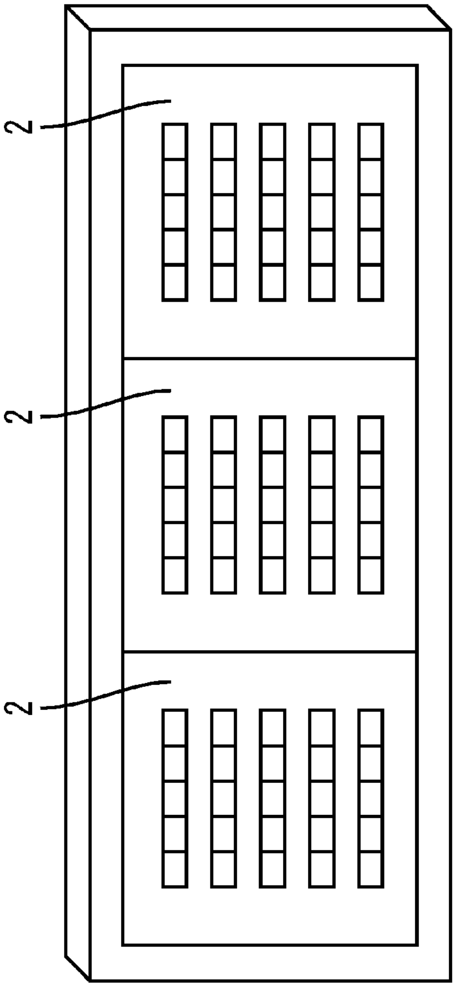

The electronic music stand 10 includes a display 22 for showing at least one full sheet of music 2. As shown in FIGS. 4(*a*)-(*c*), the display can be sized to show a sheet, two sheets or three sheets of sheet music 2. Alternative embodiments may display more sheets of music. In particular embodiments, the display 22 is in color, however, alternative embodiments may be in black and white, grayscale, monotone, or the like. In some embodiments, the display is a touch screen to allow manipulation or interaction with the screen in a touch manner, similar to that used on a PDA (personal digital assistant) or the like. If a touch screen display 22 is used, a stylus 24 may be provided, and which may be stored in a stylus holder 26 on the electronic music stand 10. In particular embodiments, the stylus 24 is used to interface with the touch screen display 22 to select items, menus or options. In other embodiments, the stylus is used to input handwriting or to assist in "scoring" the stored music with for example, but not limited to, hash marks, handwritten notations, scaling, or the like.

The display 22 may show sheets of music 2 and/or different menu screens to facilitate use by the musician. In still other embodiments, the display 22 may include a back light feature. This would allow the musician to light up and see the display 22 in dark areas. In particular embodiments, the brightness and other optical characteristics of the display 22 are adjustable so that the user may change them to suit their needs, preferences and playing environments.

Embodiments of the electronic music stand 10 may have one or more speakers 28. The speakers 28 may be used to produce sounds or tones useful for tuning musical instruments. The speakers may also be used to play music. For instance, the music may be generated by reading and playing the sheet of music 2 displayed on the display 22. Alternatively, the speakers 28 may be used to play pre-recorded music, such as from a CD, DVD, memory or the like. In further alternatives, the pre-recorded music may be used to play along with the music being performed by the musician. In alternative embodiments, the speakers 28 may be used as a metronome to produce a time signal or beat that the musician may utilize during their play of a piece of music that is displayed on the display 22. In particular embodiments, the speakers may have the volume controlled by a switch on the electronic music stand, alternatively, the volume may be controlled using software contained on the electronic music stand 10.

Embodiments of the present invention may include one or more microphones 30 to allow the musician to record music while performing a piece of music. In alternative embodiments, the microphone 30 may be used to pick up notes by a musical instrument. In some embodiments, the picked up notes may be used to assist in the tuning of the musical instrument. In other embodiments, the picked up notes may be used to highlight the notes being played on the sheet of music 2 shown on the display 22. This could assist the user in following the music and not loosing their place as they move through the piece of music. Alternatively, the electronic music stand 10 may use the picked up notes to track progress and compare notes picked up to the displayed sheet of music 2. As the electronic music stand 10 follows along with the musician's progress in the piece of music, it then automatically changes (e.g., turns) the sheet of music 2 shown on the display 22 to the next sheet of music 2, when it reaches the end of the displayed sheet of music 2. In alternative embodiments, the electronic music stand 10 may include one or more jacks to accept an external microphone and/or instrument pick-up to facilitate the above. In further alternatives, the external microphone may be used for singing along with the musician, karaoke, or the like. In particular embodiments, the microphone 30 can be used to determine when a wrong note or error is made to halt progress of the piece. In alternative embodiments, when an error or wrong note is detected, the music stand 10 will reset the piece to the beginning so that the user can restart. In other alternatives, the music stand may restart at a predetermined position and recycle until the user hits the correct notes. In other embodiments, the microphone 30 may be used to record a piece of music. The recorded music may then be burned to a CD/DVD or stored on other memory media for transport or play on another device.

In particular embodiments, the electronic music stand 10 may include one or more motion sensors 32. The motions sensors 32 may be activated by detecting motion that is close to the display 22 area of the electronic music stand 10. In some embodiments, when motion is detected by the motion sensors 32, the sheet of music 2 shown on the display 22 is changed to the next sheet of the sheet of music 2. The motion sensor 32 facilitates changing sheets without having to physically touch the sheet of music 2 or the display 22, and thus minimizes the time to change sheets or the possibility of knocking over the electronic music stand 10 during a performance. For displays 22 that display more than one sheet of music 2 at a time, the motion sensors 32 may be used to turn multiple sheets of music 2 at a time. For instance, as shown in FIG. 4(*b*), if two sheets of music 2 are shown, the display 22 may switch to show the next two sheets of music 2 when a motion is detected by the motion sensors 32. In alternative embodiments, the musician may set preferences, and on multiple sheet display 22 (see FIGS. 4(*b*)-(*c*)), the left most sheet of music 2 may be replaced by the sheet music 2 on its right and then a new sheet of music 2 will appear in the right most position of the display. In particular embodiments, the motion sensors 32 are IR, while alternatives may use other motion sensing techniques, such as RF, vibration, optical, sounds or the like.

In some embodiments, the motion sensors 32 provide direction capabilities (for example, but not limited to paired sensors) so that motion in one direction moves forward through the music 2, while the opposite motion moves back through the music 2. This would be helpful for pieces that have repetitive sections. In various embodiments, the motion sensors 32 may be adjustable in angle (or may use multiple sets of sensors 32 angled to different orientations) so that the a user can detect motion in particular areas of a user's body and avoid other areas. For example, a violinist often moves the upper body so that the motion sensors 32 might give erroneous results if focused (or used) on the upper body, but might work fine if focused on the violinists feet. In particular embodiments, the user can adjust the sensitivity of the motion sensors 32 and which motion sensors are used to suit there individual needs and preferences.

In further alternative embodiments, the electronic music stand 10 may include one or more pedal actuators 34 connected by a cable 36 to the electronic music stand 10. The pedal actuator 34 may be used to change the sheets of the sheet of music 2, in a manner like the motion sensors 32, or may be used to control other functions of the electronic music stand 10. An advantage to the pedal actuator 34 is that it frees the hands of the musician during a performance. In some embodiments, the pedal actuator 34 is connected by wireless methods, such as RF, sonics, IR, optical, Bluetooth or the like. In embodiments, the pedal actuator 34 may be present with or without the presence of the motion sensors 32.

Particular embodiments may include one or more buttons 38 that are used to activate various features or modes of the electronic music stand 10. A button 38 may also be used to turn the music stand 10 on. The buttons 38 may be formed as switches, knobs, sliding controls, touch sensors, key pads or the like. In addition, some embodiments may include ports useable to connect a standard keyboard to the electronic music stand 10. In alternative embodiments, a mouse (either wireless or wired) may be used to control and activate features on the electronic music stand 10. In still further embodiments of the electronic music stand 10, an Apple iPod like interface with playlists and wheel control may be used. In some embodiments, buttons 38 may be used to switch sheets of music 2. For instance, forward and reverse buttons may be used, and a single press will activate a sheet change in a desired direction.

To place sheets of music 2, programs or data in the electronic music stand 10, embodiments may include the ability to interface with one or more input devices. Examples include, but are not limited to, a CD drive 40, a firewire port 42, USB ports 44, RS-232 connectors, Ethernet connectors, or other data input ports. In some embodiments, the CD drive is a CDRW drive that permits writing as well as reading of CDs. Other alternatives may include a DVD capability (either read only or writeable) to expand the media useable by the electronic music stand 10. Further alternative embodiments may utilize wireless methods, such as RF, sonics, IR, optical, Bluetooth, or the like, to transfer data to and from the electronic music stand 10. Further embodiments may be connectable to the Internet or other servers to permit access to data, music and programs. Sites such as Apple iTunes, Real Rhapsody, Napster, musicnotes.com or the like may be used. Alternatively, data may be downloaded directly from computers, PDA's, smart phones, MP3 players, multimedia devices, or the like. Still other embodiments may use a camera (e.g., built-in or stand alone) to take a picture of a sheet of music and transfer it to the electronic music stand 10. Other embodiments may use interfaces to transfer music data from an iPod. Other embodiments may use interfaces to back up programs, data or music stored in the electronic music stand 10.

Embodiments of the electronic music stand 10 may be powered by an external power source and adapter 46 connected by a power line 48. The electronic music stand 10 may also include internal power sources, such as a battery, solar cells or the like to permit operation away from convenient power sources. In particular embodiments the power source is rechargeable. However, non-rechargeable sources may be used as well.

Figure 2:
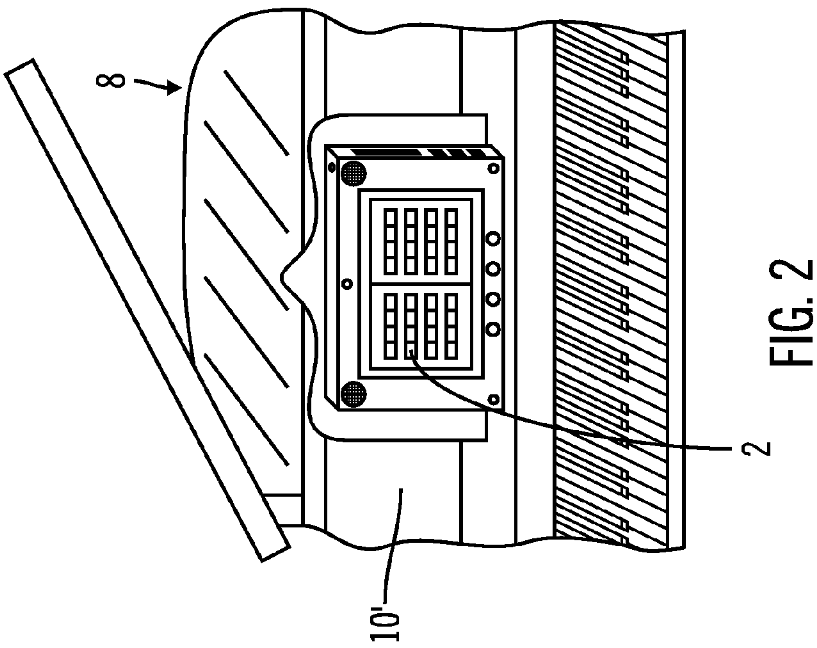
FIG. 2 is a perspective view of an electronic music stand mounted on a piano in accordance with an embodiment of the present invention.

FIG. 2 shows an electronic music stand 10' in accordance with another embodiment of the present invention. This embodiment is very similar to the embodiment described above, but is designed to be used without a base 12. Advantages of this embodiment are that it is particularly well suited for placement and use with keyboard instruments, such as a piano 8, keyboard, synthesizer, mixer, organ, harpsichord, or the like. The electronic music stand 10 could also be placed on existing music stands, podiums or the like, if they could hold the electronic music stand 10 securely. Particular embodiments may be provided with attachment structures, such as straps, weights, magnets, Velcro, or the like, to assist in securing the electronic music stand 10' to the object supporting the electronic music stand 10'

Figure 3:
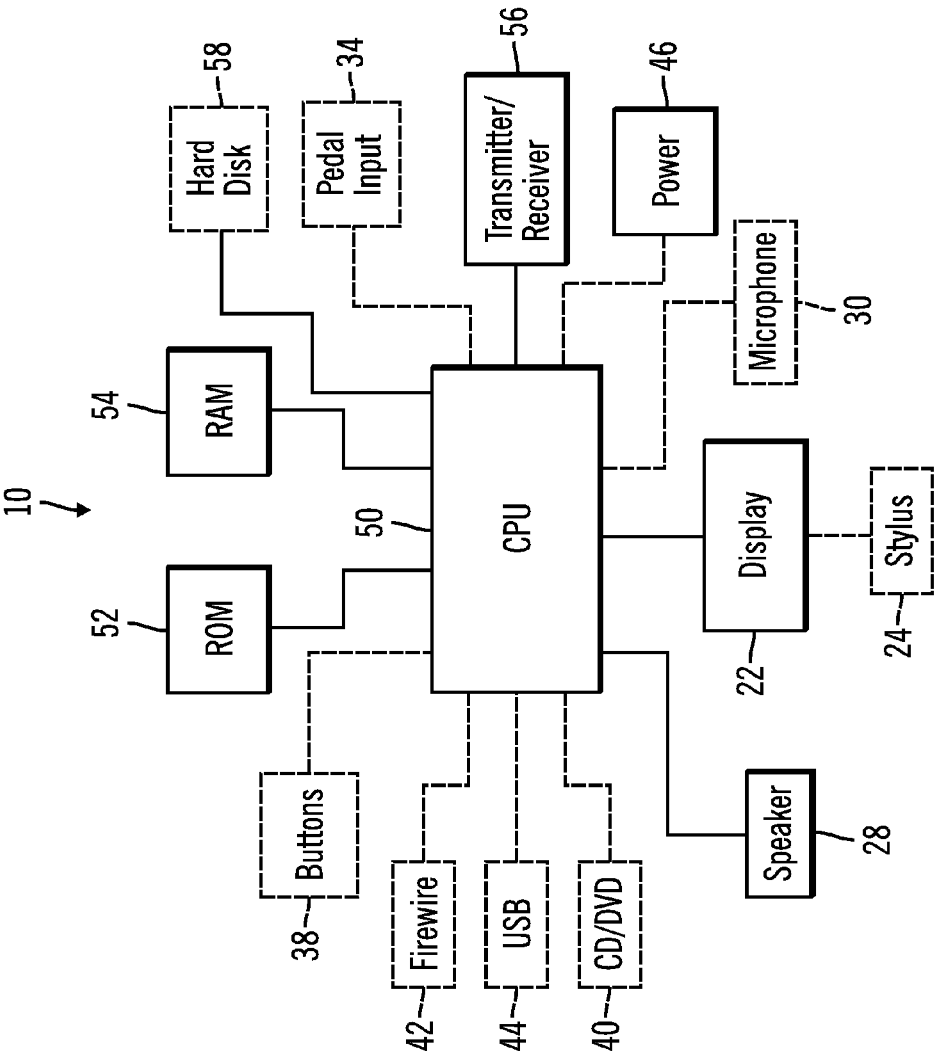
FIG. 3 is a simplified block diagram of an electronic music stand in accordance with the embodiment of the present invention shown in FIG. 1.

FIG. 3 illustrates a simplified block diagram of the electronic music stand 10 shown in FIG. 1. Items shown in dashed lines are considered optional, and are included in particular embodiments and not others. Some elements may be formed as hardware, software or a combination of both, as understood by those of ordinary skill in the art. A CPU (processor, microprocessor, or the like) 50 is utilized to control the operations of the electronic music stand 10. The CPU 50 is connected to a ROM 52 and a RAM 54. In particular embodiments, the ROM 52 is an EPROM and the RAM 54 is a static RAM; however, other comparable memory storage components may be used, such as but not limited to DRAM, Flash Memory, Virtual RAM, Caches, or the like. The ROM 52 generally stores the programs used by the CPU to determine and operate various parameters, such as the display and progression of the sheets of music 2. The RAM 54 is used by the CPU 32 to store information about the sheets of music 2, and musician preferences. For example, such as how many sheets of music 2 to display at a time, the timing, any highlighting or audio/visual features. In alternative embodiments, the ROM 52 and RAM 54 may be formed as a part of the CPU 50 and do not need to be separate elements.

Particular embodiments of the electronic music stand 10 have the CPU 50 coupled to a transmitter/receiver 56 so that the musician can upload and download the stored information to an external computer (not shown) through the transmitter/receiver 56. The transmitter/receiver 56 is capable of transferring data in both directions so that updated program instructions or modifications to music made on the electronic music stand 10 can be sent to the computer. In particular embodiments, the transmitter/receiver 56 can connect to the internet and/or a server. This is beneficial in downloading music as needed from music services such as, but not limited to, Apple iTunes, Real Rhapsody, Napster, or the like.

Other embodiments of the electronic music stand 10 may include a hard disk 58 to hold the sheets of music 2 for use by the electronic music stand 10. The hard disk 58 may be of a size that can hold a large number of sheets of music 2. The number of sheets of music 2 that can be stored can range from as few as 100 to as many as a 1,000, 10,000 or even more, with the range chosen based on the musicians need, the type of music, the type of performances by the musician, the type of files stored, the complexity of the music, and the like. Alternative embodiments, may utilize other memory storage mediums, such as, micro drives, SD Cards, flash memory, USB drives, or the like. For instance, alternative embodiments may store the sheets of music 2 in RAM rather than on a hard disk 58.

In particular embodiments, the sheets of music are stored as a PDF, TIFF; JPEG, PICT or Bitmap files. In alternative embodiments, the sheets of music are stored as TXT, Word processed documents or data bases. In further alternatives, the sheets of music are stored PDF files where the notes are stored so that they are either in selectable and/or searchable form. An advantage to the selectable or searchable form is that the electronic music stand 10 may uses these features to highlight music notes in the sheet of music 2, follow the notes or anticipate the changing of a sheet of music 2. In additional embodiments, the files may have included (or embedded) or associated with the image portion of a musical track such as MIDI, or other music notations format. For instance, the sheets of music 2 may be encoded to display and work in manner similar to Musicnotes Player by Musicnotes.com. Digitally stored music provides the greatest flexibility for use of the electronic music stand 10. Further alternative embodiments may be able to take music tracks, such as, but not limited to CD files, DVD files, WAV, RM, WMA, MP4, MP3, MPG, AIFF, MIDI, iTunes files or the like, and convert them into sheets of music that is displayable as a sheet of music 2 on the display 22 of the electronic music stand 10. Further embodiments may store and/or transform the music for use with Karaoke or the like. In those embodiments, the music is stored with displayed lyrics. Various versions of the electronic music stand 10 may include security software to protect the music 2 from theft. Other versions may check to make sure that only paid for music 2 can be installed on the electronic music stand 10.

Figure 5A:
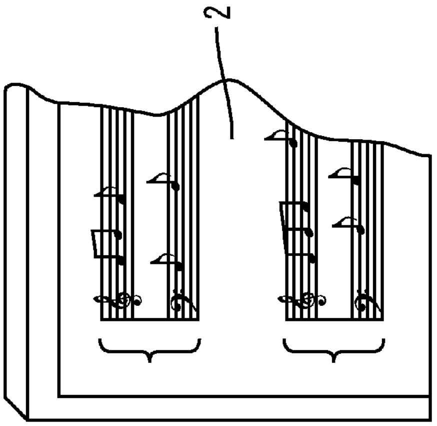
FIGS. 5(*a*)-(*c*) are partial perspective views of displays on electronic music stands in accordance with embodiments of the present invention.
Figure 5B:
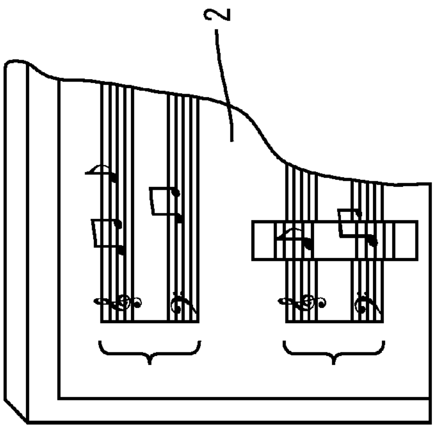
Figure 5C:
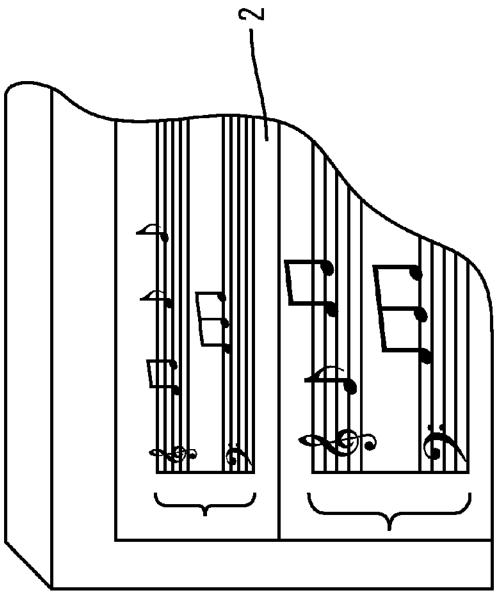

FIGS. 5(*a*)-(*c*) illustrate some of the many ways that a sheet of music 2 may be shown on the display 22 of an electronic music stand 10. FIG. 5(*a*) shows that the sheet of music 2 is simply displayed as a static sheet of music comparable to displaying a paper sheet on a traditional stand. The sheet of music 2 shown on the display 22 is changed at the command of the musician, but otherwise gives the same look and feel that a musician is used to in traditional music stands. FIG. 5(*b*) shows a slight enhancement to the sheet of music 2 as it is shown on the display 22. As the musician plays a piece of music, the corresponding notes on the sheet of music 2 are enlarged and highlighted as they are detected by the microphone 30. In particular embodiments, the highlight/enlarge feature may be able to be turned on or off when desired. Alternatively, the notes coming next after the picked up notes may be highlighted to make them easier to read or follow. In yet another alternative, the musician may set the electronic music stand 10 to highlight the notes at the speed that they should be played at (i.e., a virtual metronome) so that the musician can see and play the highlighted notes at the proper timing and speed. FIG. 5(*c*) shows an alternative where one or more whole lines of music are magnified relative to the other lines of music on the sheet of music 2 so that the music that is to be played appears larger and easier to read. This would make it easier to play music and make it more difficult for a musician to loose their place as they play. In an alternative embodiment, more than one line of music may be highlighted at the same time. For instance, the next line may be highlighted as well to facilitate the musician reading ahead. In alternative embodiments, the notes and/or lines shown in FIGS. 5(*b*)-(*c*) may be shown in a different color (such as but not limited to black, green, red, blue, yellow, purple, orange or the like) or in bold to make them easier to read and follow. In various embodiments, the user may enlarge all notes (and/or entire sheet) to facilitate reading by users who have difficulty seeing smaller notes. In some embodiments, the user may customize the note size up or down to suit individual needs and preferences.

Figure 6:
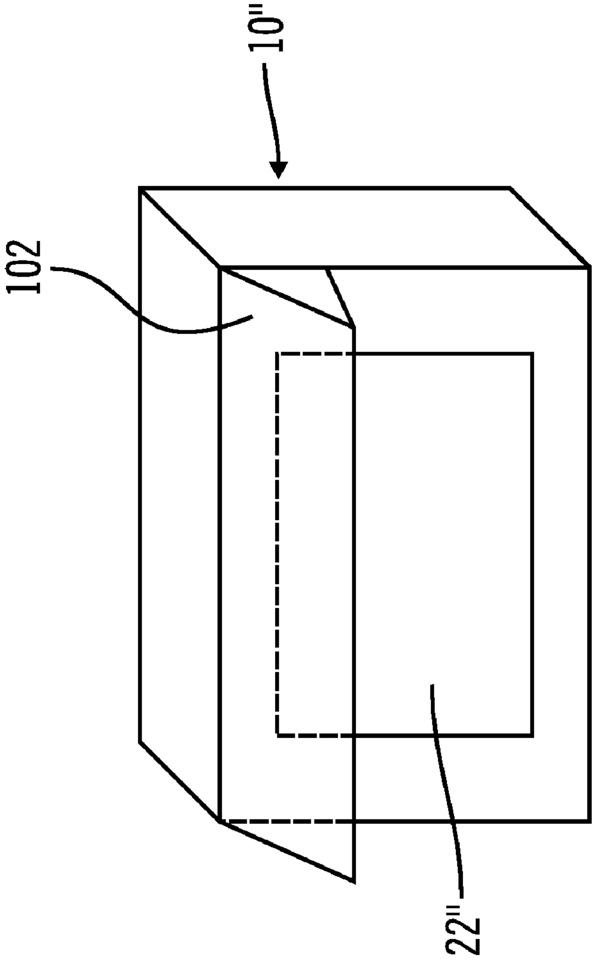
FIG. 6 is a perspective view of a light shade for an electronic music stand in accordance with an embodiment of the present invention.

FIG. 6 shows an embodiment of electronic music stand 10" with a light shade 102 attached to a display 22". This assists the musician by shading the display 22" in bright sun light and makes it easier for the displayed sheet of music 2 to be seen on the display 22". This obviates the need to use a backlight or to increase the brightness and/or contrast. In particular embodiments, the light shade 102 is attached to the electronic music stand 10" by tabs that engage a slot on the housing of the electronic music stand 10". In alternative embodiments, the light shade 102 may be secured by magnets, adhesives, Velcro, straps or the like. In still other embodiments, the light shade 102 is built in, and the user may extend it when needed or retract it (for instance into the housing) when not needed.

To use particular embodiments of the music stand 10, the musician will set up the music stand 10 (with the attached base 12, if required), and power up the electronic music stand 10. If there is no music already loaded on the electronic music stand 10, the musician will load it into the memory of the electronic music stand 10 by connecting it to a computer, Internet, or other memory storage device as discussed above. The musician will then access it to transfer the sheets of music 2 to the memory of the electronic music stand 10. Once the sheets of music 2 are in the memory of the electronic music stand 10, the musician will use the software and programs on the electronic music stand 10 to set the musicians preferences and features they want to use. Next the musician will select a sheet of music 2 to be displayed on the display 22 of the electronic music stand 10. At this point, the musician may begin to perform the music displayed on the sheet of music 2. If the microphone 30 is used, the electronic music stand 10 may automatically change the displayed sheet of music when the last note listed on the displayed sheet of music 2 is played. Alternatively, if no microphone (or tracking is used), the user may change the displayed sheet of music 2 by performing an acceptable motion over the motion sensor 32, or to use a pedal actuator, to change the displayed sheet of music 2. When the performance of the sheet of music 2 is complete, the musician may use the various interfaces available, as discussed above, to select another piece of music and to display a new sheet of music 2 to perform and repeat the process described above. Alternatively, the musician may set up a playlist in advance. The playlist may include some or all of the music to be performed, and the electronic music stand 10 will cycle through all of the sheets of music, as desired, until the entire playlist has been completed.

Further embodiments may include a tutorial or demo mode. This would assist new users with learning how to use the electronic music stand 10. This feature may also be used to refresh ones skills or to learn new features. Further alternatives may use a demo mode as an advertisement or for entertainment when the performer is on break or not performing.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electronic music stand for display of at least one sheet of music for a musician, the electronic music stand comprising:

a housing;

at least one power source to provide power to the electronic music stand;

a display sized to display the at least one sheet of music so that it is viewable during a performance by the musician of the at least one sheet of music;

at least one memory element for storing the at least one sheet of music;

at least one processor operatively coupled with the display and the at least one memory element to display the at least one sheet of music on the display;

at least one interface that allows the musician to interact with the electronic music stand to change the at least one sheet of music to a different one of the at least one sheet of music during a performance of the at least one sheet of music so that the different one of the at least one sheet of music is displayed on the display, and wherein the display shows at least one changing highlighted portion of one or more notes of the at least one sheet of music to highlight the one or more notes relative to at least one other note for easier viewing during performance of the one or more notes relative to the at least one other note, wherein the electronic music stand can keep pace along with the musician as the musician progresses through the one or more notes in the music shown on the at least one sheet of music displayed on the display, and wherein the changing highlighted portion at least includes enlarging more than one note after a note being currently performed by the musician.

2. The electronic music stand according to claim 1, wherein the at least one interface provides the musician with ability to change to the different one of the at least one sheet of music during the performance so that the musician is free of physical contact with display of the electronic music stand.

3. The electronic music stand according to claim 1, wherein the at least one interface includes at least one motion sensor to provide the musician with the ability to change to the different one of the at least one sheet of music during the performance so that the musician is free of physical contact with display of the electronic music stand.

4. The electronic music stand according to claim 1, wherein the at least one interface includes at least one pedal actuator to provide the musician with the ability to change to the different one of the at least one sheet of music during the performance so that the musician is free of physical contact with display of the electronic music stand.

5. The electronic music stand according to claim 1, wherein the electronic music stand further includes at least one speaker to produce tones useable for tuning a musical instrument.

6. The electronic music stand according to claim 1, wherein the electronic music stand further includes at least one speaker to produce musical notes from the at least one sheet of music.

7. The electronic music stand according to claim 1, wherein the electronic musical stand includes at least one microphone to pick up the notes from a musical instrument.

8. The electronic music stand according to claim 7, wherein the processor of the electronic music stand uses the notes picked up by the at least one microphone to follow the performance of the music on the at least one sheet of music.

9. The electronic music stand according to claim 1, wherein the display is sized to display more than one sheet of the at least one sheet of music displayed on the display.

10. The electronic music stand according to claim 1, wherein the display is sized to display at least two sheets of the at least one sheet of music displayed on the display.

11. The electronic music stand according to claim 1, wherein the display is sized to display an entire sheet of the at least one sheet of music displayed on the display.

12. The electronic music stand according to claim 1, wherein the display is a touch screen that allows interface using a stylus.

13. The electronic music stand according to claim 1, wherein the at least one interface allows the musician to change to another different sheet of music until all of the at least one sheets of music have been displayed on the display.

14. The electronic music stand according to claim 1, wherein the at least one memory element is sized to hold at least 100 sheets of music.

15. The electronic music stand according to claim 1, wherein the at least one memory element is sized to hold at least 1000 sheets of music.

16. The electronic music stand according to claim 1, wherein the at least one memory element is sized to hold at least 10,000 sheets of music.

17. The electronic music stand according to claim 1, wherein the display shows the at least one changing highlighted portion as further including an enlarged portion around the currently played one or more notes of the at least one sheet of music for easier viewing.

18. An electronic music stand for display of at least one sheet of music for a musician, the electronic music stand comprising:

a housing;

at least one power source to provide power to the electronic music stand;

a display sized to display the at least one sheet of music so that it is viewable during a performance by the musician of the at least one sheet of music;

at least one memory element for storing the at least one sheet of music;

at least one processor operatively coupled with the display and the at least one memory element to display the at least one sheet of music on the display;

at least one interface that allows the musician to interact with the electronic music stand to change the at least one sheet of music to a different one of the at least one sheet of music during a performance of the at least one sheet of music so that the different one of the at least one sheet of music is displayed on the display, and wherein the display shows at least one changing highlighted portion of one or more notes of the at least one sheet of music to highlight the one or more notes relative to at least one other note for easier viewing during performance of the one or more notes relative to the at least one other note, wherein the electronic music stand can keep pace along with the musician as the musician progresses through one or more notes in the music shown on the at least one sheet of music displayed on the display, and wherein the display shows the at least one changing highlighted portion as an enlarged one or more lines of music notes around the one or more notes of the at least one sheet of music currently being played by the musician for easier viewing.

19. The electronic music stand according to claim 1, wherein the electronic music stand further includes a base to support the electronic music stand above a floor.

20. The electronic music stand according to claim 1, wherein the electronic music stand further includes a light shade to cover the display and shade the at least one sheet of music displayed on the display.

21. The electronic music stand according to claim 1, wherein the display further includes a back light to illuminate the at least one sheet of music displayed on the display.

22. The electronic music stand according to claim 1, wherein the display shows the at least one changing highlighted portion as further including a colored portion around the currently played one or more notes of the at least one sheet of music for easier viewing.

23. The electronic music stand according to claim 1, wherein the display shows the at least one changing highlighted portion as further including a bolded portion around the currently played one or more notes of the at least one sheet of music for easier viewing.

24. The electronic music stand according to claim 1, wherein the display shows the at least one changing highlighted portion further includes the currently played one or more notes shown in a different color relative to other notes on the at least one sheet of music for easier viewing.

25. The electronic music stand according to claim 1, wherein the display shows the at least one changing highlighted portion further includes the currently played one or more notes shown in bold relative to other notes on the at least one sheet of music for easier viewing.

26. The electronic music stand according to claim 1, wherein the electronic musical stand includes at least one microphone to pick up the notes from a musical instrument, wherein the processor of the electronic music stand uses the notes picked up by the at least one microphone to follow the performance of the music on the at least one sheet of music, and wherein the display moves and shows the at least one changing highlighted portion further includes the currently played one or more notes shown in a different color relative to other notes on the at least one sheet of music for easier viewing.

27. The electronic music stand according to claim 1, wherein the electronic musical stand includes at least one microphone to pick up the notes from a musical instrument, wherein the processor of the electronic music stand uses the notes picked up by the at least one microphone to follow the performance of the music on the at least one sheet of music, and wherein the display moves and shows the at least one changing highlighted portion further includes the currently played one or more notes shown in bold relative to other notes on the at least one sheet of music for easier viewing.

28. The electronic music stand according to claim 1, wherein the electronic musical stand includes at least one microphone to pick up the notes from a musical instrument, wherein the processor of the electronic music stand uses the notes picked up by the at least one microphone to follow the performance of the music on the at least one sheet of music, and wherein the display moves and shows the at least one changing highlighted portion as further including an enlarged portion around the currently played one or more notes shown on the at least one sheet of music for easier viewing.

29. The electronic music stand according to claim 1, wherein the electronic musical stand includes at least one microphone to pick up the notes from a musical instrument, wherein the processor of the electronic music stand uses the notes picked up by the at least one microphone to follow the performance of the music on the at least one sheet of music, and wherein the display moves and shows the at least one changing highlighted portion further includes the currently played one or more notes shown in a different size relative to other notes on the at least one sheet of music for easier viewing.

30. The electronic music stand according to claim 1, wherein the electronic music stand is settable as a virtual metronome to set a pace for the musician to progress through the one or more notes in the music shown on the at least one sheet of music displayed on the display, and wherein the display moves and shows the at least one changing highlighted portion at the set pace to highlight the one or more notes on the at least one sheet of music for easier viewing.

31. The electronic music stand according to claim 1, wherein the display automatically changes the displayed at least one sheet of music to the different at least one sheet of music when the musician reaches an end note of the at least one sheet of music displayed on the display.

* * * * *